Feb. 27, 1923.
J. M. SOUSA
1,446,485
COMBINED TIRE CARRIER AND RIM REMOVER
Filed Aug. 18, 1919
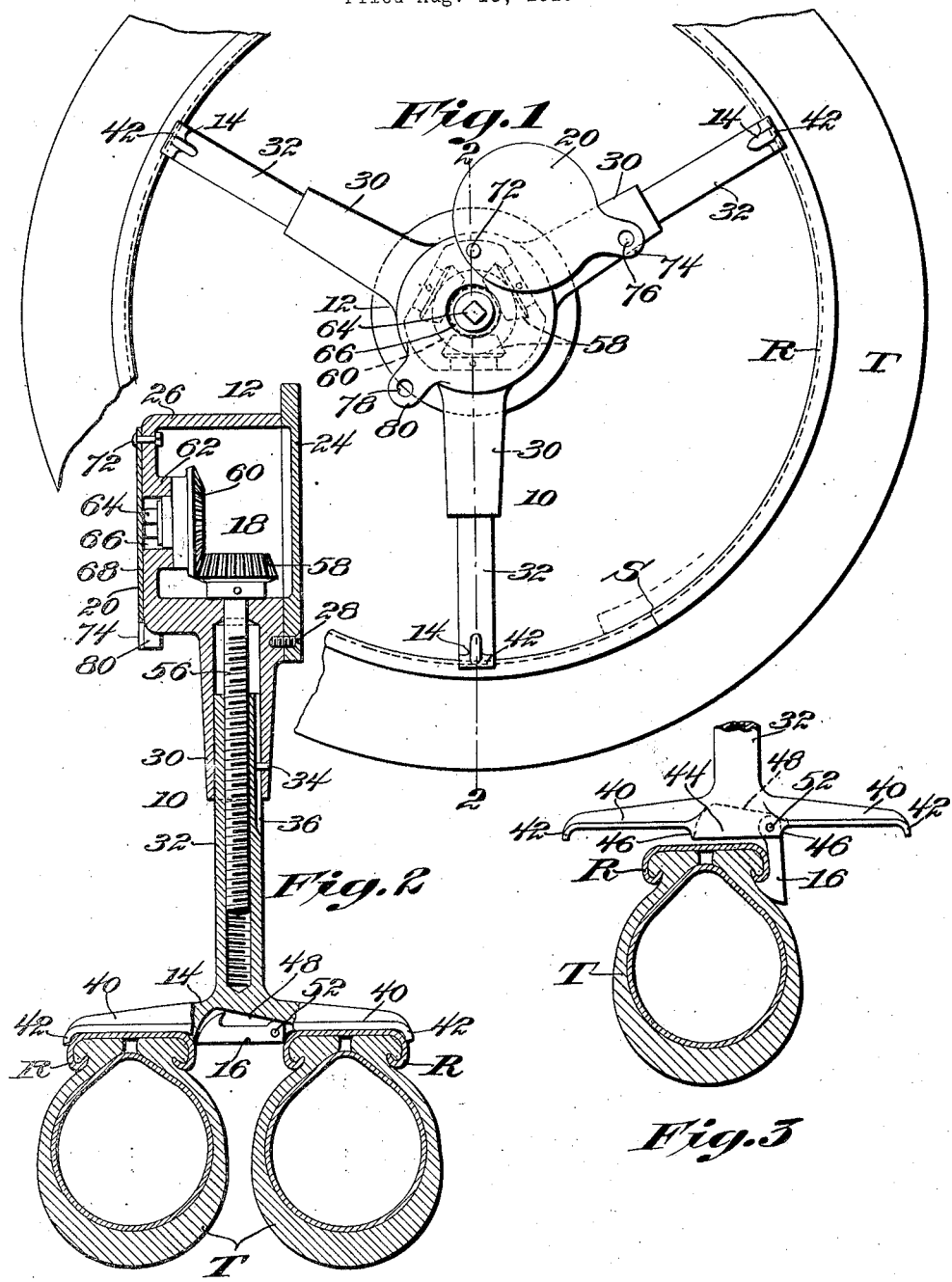

Patented Feb. 27, 1923.

1,446,485

UNITED STATES PATENT OFFICE.

JOSEPH M. SOUSA, OF WAVERLY, MASSACHUSETTS, ASSIGNOR OF ONE-FOURTH TO WANTON VAUGHAN, OF BOSTON, MASSACHUSETTS, AND ONE-FOURTH TO CLIFTON W. HAM, OF NEWTON, MASSACHUSETTS.

COMBINED TIRE CARRIER AND RIM REMOVER.

Application filed August 18, 1919. Serial No. 318,095.

*To all whom it may concern:*

Be it known that I, JOSEPH M. SOUSA, a citizen of the United States, residing at Waverly, in the county of Middlesex and State of Massachusetts, have invented certain new and useful Improvements in Combined Tire Carriers and Rim Removers; and I do hereby declare the following to be a full, clear, and exact description of the invention, such as will enable others skilled in the art to which it appertains to make and use the same.

This invention relates to a combined automobile tire carrier and rim-remover and replacer that may be conveniently mounted on an automobile in a position where it will be readily accessible for the purposes intended.

One of the objects of the present invention is to provide a device of the above-indicated character which shall be simple, durable and relatively inexpensive in construction, and effective and reliable in operation, and which shall be particularly adapted to firmly hold and positively lock spare tires and rims when serving as a tire rack or carrier and to be expeditiously manipulated with facility when utilized to remove and replace rims.

In a more specific aspect, another object of the invention is to provide a tire carrier, that in the event of tire trouble, may be rendered adaptable for instant service in collapsing a split rim to permit the easy removal of a tire and replacement of a spare, after which the collapsed rim may be easily, though forcibly, expanded to its normal position of operation.

Accordingly, one of the features of the present invention resides in a tire rack or carrier comprising a plurality of extensible or telescopic arms that radiate from a central hub which is suitably attached in any convenient position to an automobile and within which is located an actuating mechanism that is accessible for manual operation through the agency of a suitable socket wrench or the like and which functions to simultaneously and positively extend outwardly or contract inwardly the telescopic arms which are provided at their outer ends with rim-engaging heads for receiving and gripping the tire rims. The actuating mechanism comprises a plurality of threaded rods that cooperate with the extensible sections or arm extensions and which are suitably geared to a common gear wheel that is provided with a suitable nut or boss to be engaged by a socket wrench and thus actuated. Spare tires are normally held and carried by the rim-engaging heads which are forced outwardly by the actuating mechanism into positive and firm engagement with the rims. When so held, the spare tires are effectively protected from theft by means of a cover plate which is padlocked to the hub in position over the exposed nut of the actuating mechanism, thus preventing access to the actuating mechanism and consequently the release and removal of the spare tires and rims.

Another feature of the invention contemplates the use of suitable gripping devices, that are provided upon the rim-engaging heads, for the purpose of hooking over and gripping the edge of a rim to enable it to be collapsed by the positive contraction of the extensible arms through the agency of the actuating mechanism.

In removing a split-rim, or more properly in removing a tire from a split-rim, it is necessary to first employ the actuating mechanism to extend the arms and heads to preliminarily expand the rim and open the split thereof after which a screw driver or other suitable implement may be introduced into the split to force one end of the rim inwardly. Thereafter, the rim may be collapsed by reversing the operation of the actuating mechanism to cause the gripping members, through the contraction of the arms, to pull the rim into a position where the ends of the rim adjacent the split are overlapping. In this position, the rim will be contracted and pulled away from the tire, leaving it free to be easily removed, whereupon a spare tire may be replaced with facility and the rim forcibly expanded by extending the arms by means of the actuating mechanism until the adjacent ends of the split are again in abutting relation and operative position, when the assembled tire and rim may be removed as a unit and applied to a wheel.

These and other objects and features of the invention will become apparent from the following description of the preferred embodiment of the invention illustrated in the accompanying drawings in which:

Figure 1 is a view in front elevation of a device constructed in accordance with the invention; Fig. 2 is an enlarged view, partially in section and partially in side elevation, taken on the line 2—2 of Fig. 2; and Fig. 3 is a detailed view illustrating a gripping device in operative position to collapse a rim.

The invention may best be understood by reference to the accompanying drawing in which the device shown comprises, in general, a plurality of radially disposed extensible or telescopic arms 10; a centrally disposed recessed hub 12; a plurality of rim engaging heads 14 at the outer ends of the arms, a plurality of gripping devices 16 associated therewith; an actuating mechanism 18 disposed within the hub 12, and a cover plate 20 that may be locked in position to prevent unauthorized access to the actuating mechanism.

The hub 12 comprises a back plate 24 that is adapted to be suitably secured to any desired portion of an automobile and a hollow casing 26 that is attached to the back plate by means of screws 28. This casing 26 is provided with a plurality of integral equally spaced hollow arms 30, within which are slidably mounted in telescopic relation a plurality of arm sections or extensions 32, which are prevented from rotative movement by means of pins 34 carried by the stationary arms 30 and projecting into longitudinal slots 36 in the arm sections. At the outer end of each arm extension 32 is located a rim-engaging head 14 which preferably is integral therewith and which comprises a plurality of oppositely extending supporting arms 40 having outwardly turned ends 42 to receive a plurality of spare split-rims R and tires T of any well-known construction. The central portion 44 of each head between the respective supporting arms 40 is slightly raised and provided with outwardly curved abutments 46 to assist in properly locating and positioning the rims and tires. The central portion 44 of each head 14 is provided with a recess 48 within which the gripping device 16 is normally positioned when the apparatus is being employed as a tire carrier, as shown in Fig. 2. Each of the gripping devices 16 conveniently comprises a hooked member that is pivotally mounted upon a pin 52 and which is adapted to be positioned, as shown in Fig. 3, for the purpose of collapsing a split-rim.

In order to positively extend and contract the telescopic arms 10 to force the rim-engaging heads 14 outwardly or pull them inwardly, a plurality of actuating rods 56 are severally disposed within the respective arms 10 and in co-operative threaded relation to the arm extensions 32, as shown in Fig. 2. The inner ends of these rods are provided with gears 58 that are pinned thereto and that mesh with a common gear 60. The gear 60 is rotatably mounted in a bearing 62 constituting a part of the hub casing 26 and is provided with an extended hub or nut 64 that projects into an opening 66 in the front face 68 of said casing. This nut is adapted to be engaged by a suitable socket wrench or similar implement, through the agency of which the operator may rotate the gear 60 in either direction and therefore positively and forcibly extend or contract the telescopic arms 10 as desired.

The cover plate 20 is pivotally mounted at 72 to the outer face of the casing 26 and, during periods when the apparatus serves as a tire carrier, is positioned as shown in Fig. 2 to cover the nut portion 64 of the gear 60. The plate 20 is provided with an extended lug 74 having an opening 76 which is adapted to register with an opening 78 in a lug 80 that is integral with the casing 26, in order that a suitable padlock, or other similar device, may be employed to positively lock the cover in position and to thereby prevent the unauthorized manipulation of the apparatus and the removal and theft of spare tires and rims.

The apparatus is shown in Figs. 1 and 2 as carrying a pair of spare tires which are seated upon the supporting arms 40 and are firmly and positively held in position by the rim-engaging heads, which have been previously forced outwardly by the positive extension of the radial arms effected through the agency of the actuating mechanism in the manner already mentioned. Obviously, in order to remove a spare tire and rim for replacement upon a wheel, it is only necessary to unlock the cover plate 20 and rotate the actuating mechanism to contract the extensible arms 10 sufficiently to permit a rim and tire to be removed.

In the event of tire trouble, and the necessity of removing a defective tire from a rim and replacing it with a new one, the assembled rim and tire are first placed in position over the central portion 44 of the rim-engaging heads 14 with the gripping devices 16 in their outer positions and hooked over the edge of the rim in gripping relation, as shown in Fig. 3. The actuating mechanism is then operated to forcibly expand the rim and open the split S thereof, in order to permit the insertion of a screw driver, or similar implement, which may be used to pry one end of the rim into a position inside the other. The actuating mechanism is then operated in the reverse direction to contract the extensible arms 10 and to cause the hooked gripping devices 16 to forcibly pull in and collapse the rim into a position in which the respective ends thereof overlap one another, as shown in dotted lines in Fig. 1. With the rim thus contracted or collapsed and pulled away from the tire, the tire may be removed with facility as will be understood. Subsequently a new tire may be replaced upon the collapsed rim after which the actuating mechanism is operated to extend the arms 10 and force the collapsed rim outwardly into engagement with the tire until the respective ends thereof are forcibly positioned in normal abutting operative relation. Thereupon, the rim and newly mounted tire may be removed as a unit from the apparatus and placed upon the wheel in the usual manner.

Although the invention has been shown and described as embodying more or less specific details of construction, arrangements and locations of parts, it will be readily understood by those skilled in the art that the advantages and benefits of the invention may be secured by various modifications without departing from the spirit and scope of the invention. It is therefore desired that only such limitations shall be imposed as are indicated in the appended claims.

I claim—

1. An automobile tire rim-remover having, in combination, a plurality of radially disposed arms, means carried at the ends of the arms for engaging and gripping the rim at a plurality of points, rotatable rods disposed within said arms and screw threaded into a section of said arms, centrally located gear mechanism for simultaneously rotating said threaded rods for extending said arms to expand the rim and open the split thereof and for simultaneously contracting said arms to cause said gripping means to collapse said rim with the ends of the rim overlapping to enable the tire to be removed.

2. An automobile tire rim-remover having, in combination, a plurality of radially disposed telescopic arms, means carried at the ends of the arms for engaging and gripping the rim at a plurality of points, threaded rods disposed co-axially within said arms and cooperating with the movable sections thereof, gears fixed on the inner ends of said rods, and a gear meshing with each of said first named gears and provided with means to enable it to be turned in opposite directions, whereby rotation thereof in one direction will extend the telescopic arms and expand the rim to open the split thereof and rotation in the opposite direction will contract said arms and cause said rim-engaging and gripping means to collapse the rim.

3. An automobile tire rim-remover having, in combination, a plurality of radially disposed arms, rim-engaging heads at the outer ends thereof for engaging the rim at a plurality of points, actuating means for extending said arms outwardly to cause said heads to expand the rim and open the split thereof, and pivotally mounted members associated with said heads and adapted to be positioned for gripping said rims and effecting their collapse when said actuating means is operated to contract said arms inwardly.

4. An automobile tire rim-remover having, in combination, a plurality of radially disposed arms, rim-engaging heads at the outer ends thereof for engaging the rim at a plurality of points, actuating means for extending said arms outwardly to cause said heads to expand the rim and open the split thereof, and hooked gripping means normally carried within said heads but capable of being withdrawn therefrom to hook over, grip and collapse said rims when the actuating means is caused to contract said arms inwardly.

5. An automobile tire carrier having, in combination, a recessed hub having radially disposed apertured arms, arm extensions telescopically associated with said arms, means for preventing rotation of said arm extensions but permitting longitudinal movement thereof, rim-engaging heads on the outer ends of said arm extensions, and means disposed within said hub and arms constructed and arranged to simultaneously and positively actuate said arm extensions either outwardly or inwardly to hold or release a tire rim.

6. An automobile tire carrier having, in combination, a recessed hub, a plurality of telescopic arms radiating therefrom, rim-engaging heads at the outer ends of said arms, threaded rods disposed within said arms and cooperating therewith, and means disposed within said recessed hub for causing said threaded rods to positively actuate said arms either outwardly or inwardly to hold or release a tire rim, said means comprising gears fixed to the inner ends of said rods and a gear meshing in common with said first named gears and capable of being rotated in opposite directions.

7. An automobile tire carrier having, in combination, a centrally located recessed hub, a plurality of arms projecting radially therefrom, rim-engaging heads at the outer ends of said arms comprising oppositely projecting supporting members to receive a pair of tire rims, and mechanism including gearing disposed within said recessed hub and telescopic arms for extending said arms outwardly to cause said rim-engaging heads to firmly hold and carry the tire rims and for positively contracting said arms to cause said heads to release the rims.

8. A combined automobile tire carrier and rim-remover adapted to be mounted on an automobile having, in combination, a plurality of rim-engaging heads for engaging a tire rim at a plurality of points, actuating means adapted to force said heads outwardly to firmly hold the tire rim when the device is used as a carrier and for similarly actuating said heads to expand the rim and open the split thereof when used as a rim-remover, and means associated with said rim-engaging heads and inoperative when the device is used as a carrier but operative when used as a rim-remover for gripping the rim at a corresponding number of points and collapsing the expanded and opened up rim when said actuating means is operated to pull said rim-engaging heads inwardly during the rim-removing operation.

9. A combined automobile tire carrier and rim-remover adapted to be mounted on an automobile having, in combination, a plurality of radially disposed arms, rim-engaging heads at the outer ends thereof for engaging the rim at a plurality of points, centrally disposed actuating means comprising gearing and rotatable threaded operating rods cooperating with said telescopic arms for positively extending and contracting said arms, said actuating means being adapted to extend the arms to cause the rim-engaging heads to hold the rim when the device is used as a carrier and to function similarly to effect the expansion of the rim and opening up of the split thereof when used as a rim-remover, and means associated with said heads for gripping the rim and forcibly effecting its collapse and the overlapping of its ends when the actuating means is operated to contract said arms during the rim-removing operation.

10. A combined automobile tire carrier and rim-remover adapted to be mounted on an automobile having, in combination, a plurality of extensible arms, rim-engaging heads at the outer ends thereof, each comprising a central portion and oppositely projecting supporting members, said supporting members being adapted to receive tire rims when the device is used as a carrier and said central portions being adapted to receive a tire rim when used as a rim-remover, actuating means for forcibly extending said arms to cause the supporting members of said heads to hold the rims when serving as a carrier and to cause the central portions thereof to expand the rim and open the split thereof when serving as a rim-remover, and means associated with said central portions of the heads for gripping the edge of an expanded rim positioned thereon and effecting its collapse when the actuating means is operated to forcibly contract said arms during the rim-removing operation.

11. An automobile tire carrier having, in combination, a hub comprising a recessed casing having a restricted opening in its exposed face and a plurality of radially projecting arms, arm extensions longitudinally slidable within said arms, rim-engaging heads at the outer ends of said arm extensions, actuating mechanism enclosed within said recessed casing and cooperating with said arm extensions for simultaneously extending and contracting said arm extensions, a portion of said mechanism by which the mechanism may be operated projecting outwardly within said restricted opening in the exposed face of said casing, and a removable cover plate normally disposed over said opening and projecting portion of said actuating mechanism and adapted to be locked in said position.

12. A device adapted to be secured to an automobile and to serve both as a tire and rim carrier and a rim-remover having, in combination, means for engaging the inner periphery of the rim, actuating means for expanding said engaging means to firmly hold the rim and tire when serving as a carrier, and means carried by said rim-engaging means and normally inoperative when the device is utilized as a carrier but capable of being positioned to grip the rim when the device is used as a rim-remover, said actuating means being adapted to contract said rim-engaging means and associated rim gripping means to collapse the rim when the device is used as a rim-remover.

13. A device adapted to be secured to an automobile and to serve both as a tire and rim carrier and a rim-remover having, in combination, means for engaging the inner periphery of the rim at a plurality of points, means carried thereby and adapted to be operably positioned to grip the rim only when the device is used as a rim-remover, and means for forcibly expanding said rim-engaging means to firmly hold the rim and tire in position to be carried and for contracting said rim-engaging means and the operably positioned rim-gripping means to collapse the rim when the device is used as a rim-remover.

14. A device adapted to be secured to an automobile and to serve both as a tire and rim carrier and a rim-remover having, in combination, a plurality of radially disposed extensible arms having laterally projecting supporting members associated therewith upon which a rim and tire rest, actuating means for concurrently expanding said arms to forcibly hold the rim and tire in position when the device is used as a carrier, and tire gripping means pivotally mounted upon the ends of said arms and adapted to occupy inoperative positions when the device is used as a carrier and to be positioned to grip the rim when the device is used as a rim-remover, said actuating means being adapted to contract said arms to cause the gripping means to collapse the rim when the device is used as a rim-remover.

15. A device adapted to be secured to an automobile and to serve both as a tire and rim carrier and a rim-remover having, in combination, a plurality of radially disposed arms having two sets of oppositely projecting supporting members at the outer ends thereof, each set being adapted to carry a rim and tire, actuating means for forcibly extending at least one of said arms to cause both rims and tires to be firmly held in position to be carried, and means disposed at the ends of said arms and intermediate the two sets of supporting members for gripping the rim of a tire when positioned over the ends of said arms, said actuating means being adapted to contract at least one of said arms to cause said gripping means to collapse the rim when the device is used as a rim-remover.

16. A device adapted to be secured to an automobile and to serve both as a tire and rim carrier and a rim-remover having, in combination, a plurality of radially extending arms having two sets of oppositely projecting supporting members at ends thereof for carrying a pair of rims and tires in side-by-side relation, means for forcibly extending at least one of said arms to cause the rims and tires to be held firmly in position to be carried, and normally inoperative hooked members carried at the ends of said arms between the sets of supporting members and adapted to be positioned to grip the rim of a tire placed over the ends of said arms when the device is used as a rim-remover, said actuating means being adapted to contract at least one of said arms to cause said gripping means to collapse the rim.

17. A tire-remover having, in combination, a plurality of radial arms having rim-engaging heads at the ends thereof, hooked members pivotally mounted in said heads and adapted to be positioned to grip the edge of the rim of a tire placed on said heads, and means for extending at least one of said arms to expand the rim and open the split thereof and for contracting said arm to cause said hooked members to grip the rim and effect its collapse.

18. An automobile tire carrier having, in combination, a plurality of outwardly extending arms to receive a rim and tire to be carried, a recessed hub therefor, actuating means disposed within said hub for forcibly extending at least one of said arms to cause said arms to firmly hold said rim and tire, and a removable cover plate secured to said hub for enclosing said actuating means and adapted to be locked in position to prevent manipulation of said actuating means.

19. An automobile tire carrier having, in combination, a recessed hub, a plurality of telescopic arms radiating therefrom, heads at the outer ends of said arms, threaded rods disposed within said arms and cooperating therewith, and means disposed within said recessed hub for causing said threaded rods to positively actuate said arms either outwardly or inwardly to hold or release a tire rim, said means comprising gears fixed to the inner ends of said rods and a gear meshing in common with said first named gears and capable of being rotated in opposite directions.

JOSEPH M. SOUSA.